May 4, 1954  R. P. BAGDIGIAN  2,677,421
DIE CUTTER MACHINE, INCLUDING PRESSURE FINGERS
Filed July 28, 1952  3 Sheets-Sheet 1
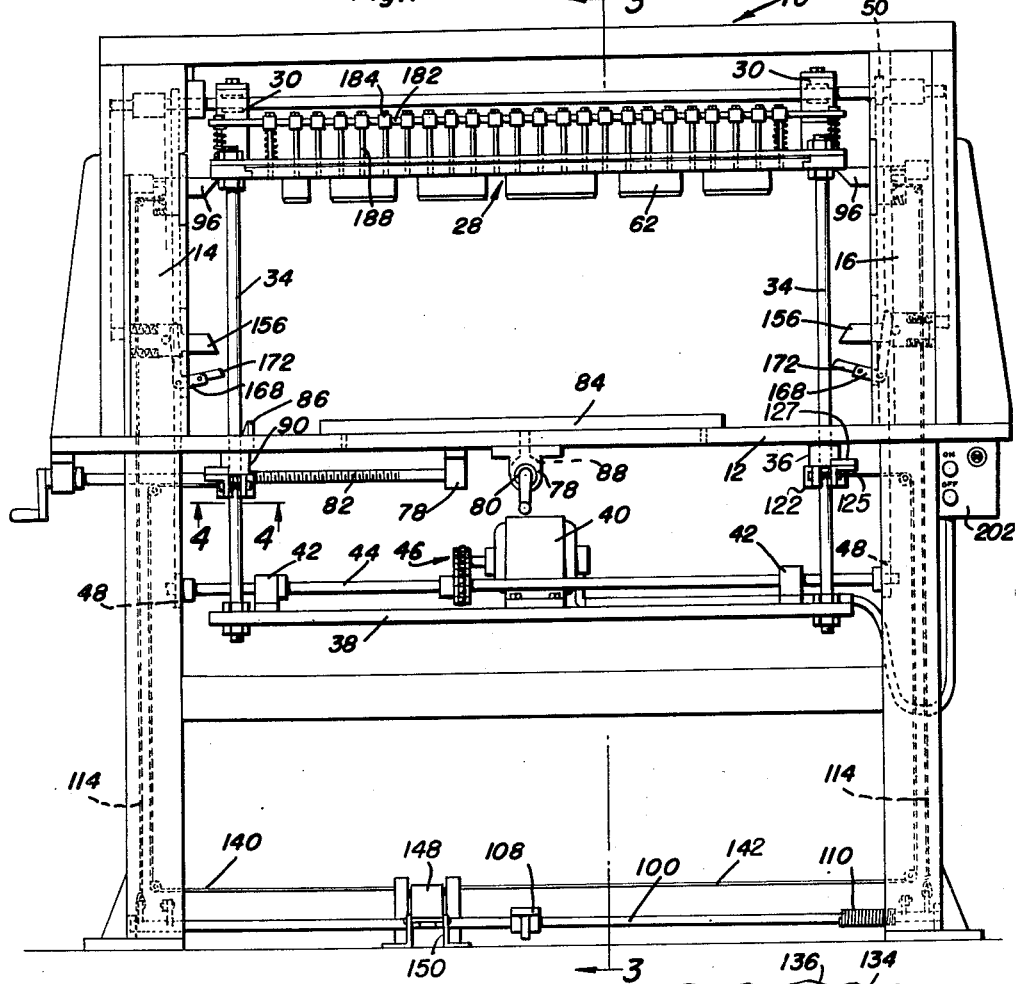
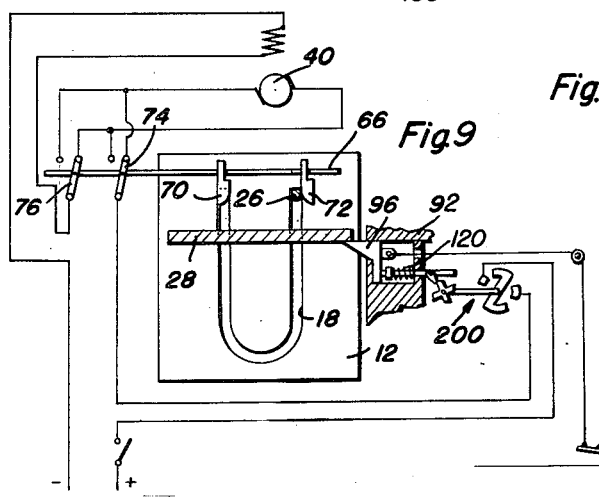
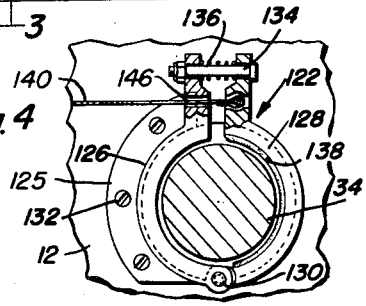
Ralph P. Bagdigian
INVENTOR.

May 4, 1954  R. P. BAGDIGIAN  2,677,421
DIE CUTTER MACHINE, INCLUDING PRESSURE FINGERS
Filed July 28, 1952  3 Sheets-Sheet 2
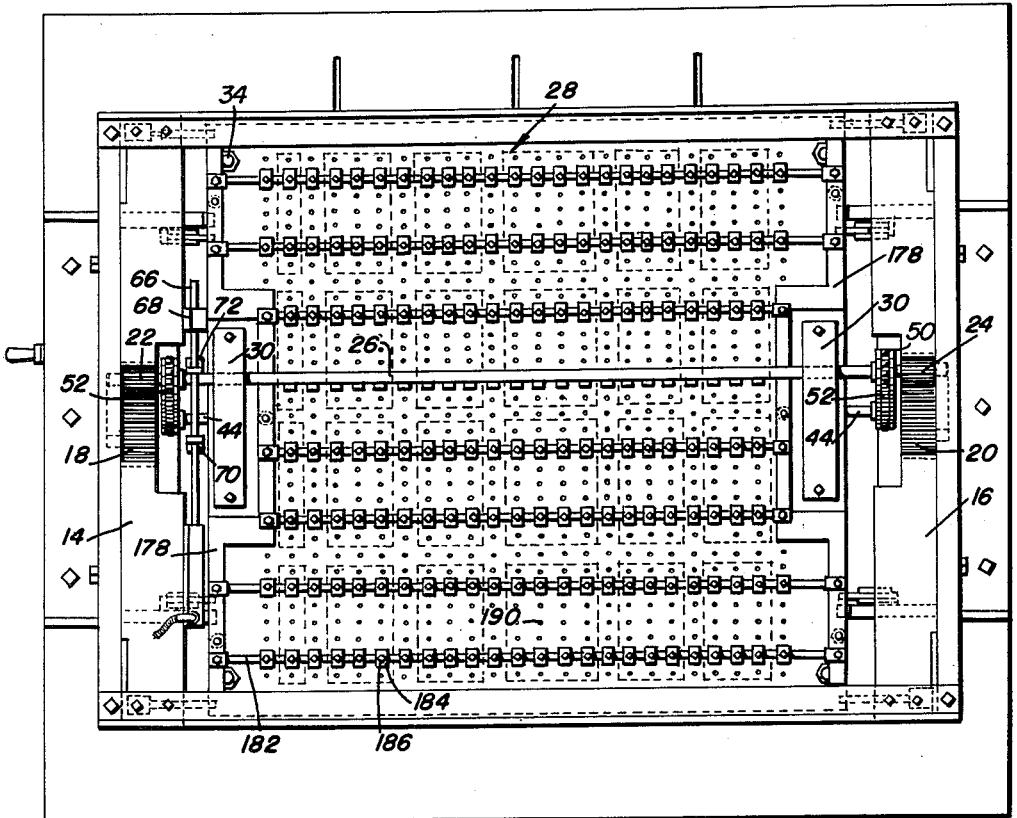
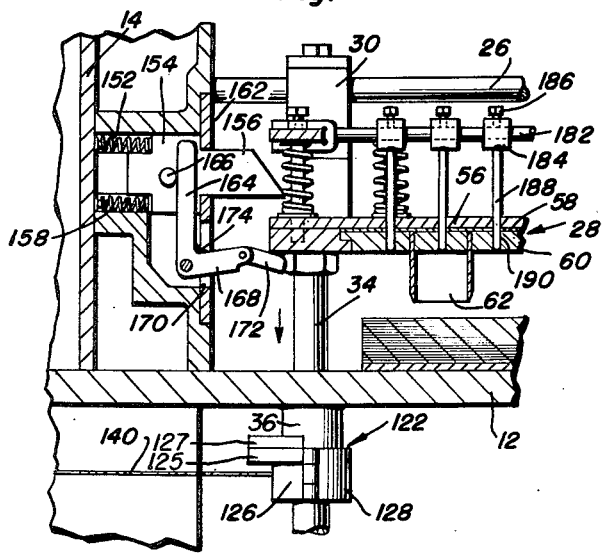
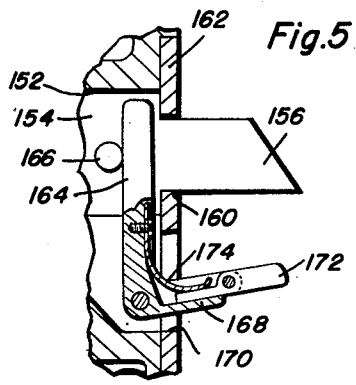
Ralph P. Bagdigian
INVENTOR.

May 4, 1954  R. P. BAGDIGIAN  2,677,421
DIE CUTTER MACHINE, INCLUDING PRESSURE FINGERS
Filed July 28, 1952  3 Sheets-Sheet 3
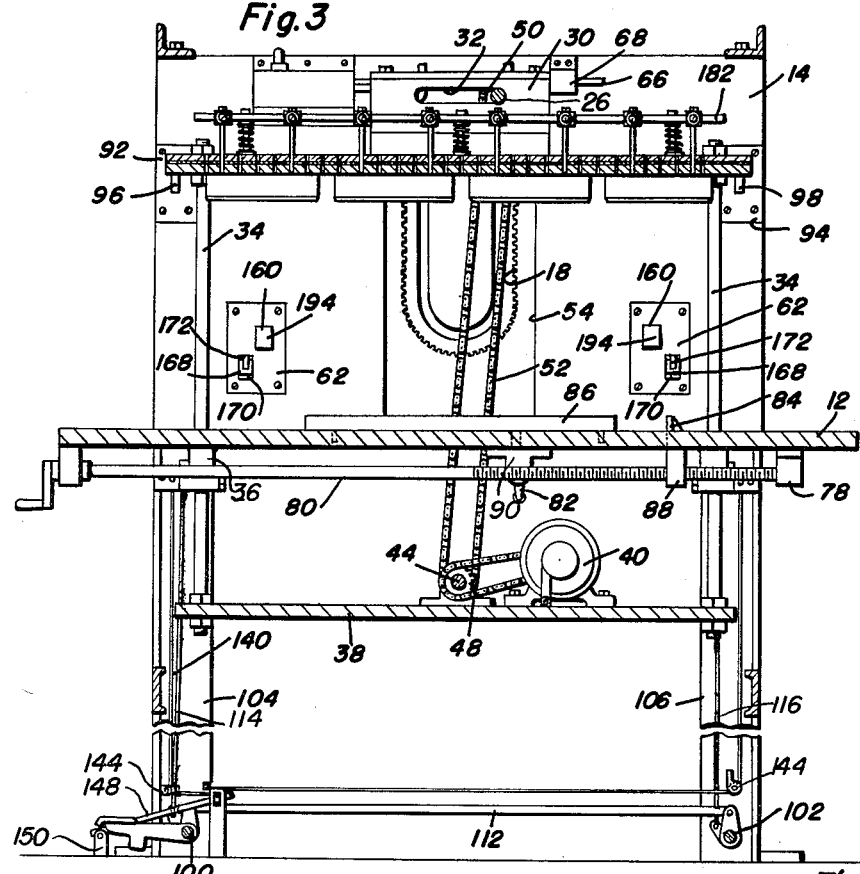
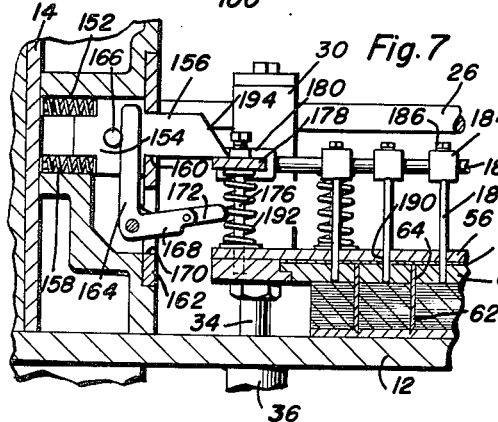
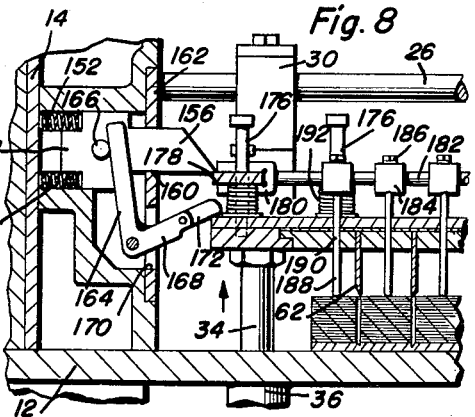
Ralph P. Bagdigian
INVENTOR.

Patented May 4, 1954

2,677,421

UNITED STATES PATENT OFFICE 2,677,421

DIE CUTTER MACHINE, INCLUDING PRESSURE FINGERS

Ralph P. Bagdigian, Somerville, Mass.

Application July 28, 1952, Serial No. 301,343

7 Claims. (Cl. 164—23)

This invention relates to new and useful improvements in cutting machines and comprises improved features over the cutting machine disclosed in my copending application, serial number 205,169 filed January 9, 1951 now United States Patent No. 2,610,684.

The primary object of the present invention is to provide a die cutting machine including a vertically reciprocating cutter support and novel and improved means for holding material cut by the support against a table top as the cutters on the support are raised from the material, whereby the cutters may be retracted without binding in the material they cut to tear or twist the material.

Another important object of the present invention is to provide a cutting machine wherein the means for pressing the cut material against a table top as the support is raised, is timed to be released by the support after the cutters on the support are retracted from the cut material.

A further object of the present invention is to provide a hold down mechanism for shearing machines that will press material against a table top as the cutter support holding the mechanism is raised and which mechanism is composed of vertically slidable fingers that will be clear of the cutters on the support during action of the cutters in the cutting operation.

A still further aim of the present invention is to provide a hold down mechanism that is extremely efficient and reliable in operation, small and compact in structure, strong and durable in operation, inexpensive to manufacture, service and install, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a front elevational view of the present invention;

Figure 2 is a plan view of Figure 1;

Figure 3 is a vertical sectional view taken substantially on the plane of section line 3—3 of Figure 1;

Figure 4 is an enlarged detail horizontal sectional view taken substantially on the plane of section line 4—4 of Figure 1;

Figure 5 is an enlarged fragmentary sectional view showing the hold down mechanism of the present invention;

Figure 6 is an enlarged detail vertical sectional view showing the cutter support being lowered and engaged with the dog release portion of the hold down mechanism;

Figure 7 is a view similar to Figure 6, but illustrating the hold down mechanism engaged with the connectors of the presser fingers and the cutters of the support in their fully lowered position;

Figure 8 is a view similar to Figures 6 and 7, but showing the cutter support being raised to actuate the dog releasing means of the hold down mechanism; and Figure 9 is a diagrammatic view of the machine to show the electric circuit and switch means employed therewith.

Referring now to the drawings in detail, wherein for the purpose of illustration, there is disclosed a preferred embodiment of the present invention, the numeral 10 represents a supporting frame, including a horizontal table top 12 and a pair of side members 14 and 16 that extend upwardly from the table top. The central vertical portions of the side members 14 and 16 are provided with U-shaped toothed guide tracks 18 and 20 that mesh with gears 22 and 24 at the ends of horizontal shaft 26.

An elongated horizontal cutter support 28 is provided with upstanding bearing and guide elements 30 at its ends that are formed with horizontal slots 32 which slidably and rotatably support the shaft 26.

Vertical rods 34 are attached at their upper ends to the support 28 and extend downwardly through vertical guide sleeves 36 in the table top 12. The lower ends of the rods 34 are attached to a horizontal platform 38 under the table top 12, on which there is mounted a preferably electric motor 40. The platform 38 additionally supports bearings 42 for a horizontal shaft 44 that is operatively connected to the armature shaft of the motor by a drive connection 46, whereby the shaft 44 will be driven by the motor.

Sprockets 48 are fixed to the ends of the shaft 44 and these sprockets are connected to sprockets 50 on the end portions of shaft 26 by endless sprocket chains 52. The chains 52 extend upwardly through recesses 54 in the side members 14 and 16 (see Figure 3).

The cutter support 28 is composed of three juxtapositioned plate members 56, 58 and 60 that are suitably removably clamped together. The central plate member 58 supports a plurality of depending tubular dies or cutters 62 that extend downwardly through accommodating slots 64 in the lower plate member 60.

When motor 40 is activated, shaft 44 will be rotated and will drive shaft 26 causing gears 22 and 24 to travel along tracks 18 and 20 to first lower the support 28, then move the support after the cutting operation has been performed in a manner similar to that disclosed in my above referred to pending application.

A horizontally slidable switch operating rod 66 is slidably received in guides 68 on the inner face of side member 14 and carries a pair of cams 70 and 72 that will selectively register with the leg portions of the guide tracks 18. A pair of switch members 74 and 76 are pivotally attached to the rod 66. When shaft 26 is moved upwardly in one leg portion of the guide track 18 it will engage cam 72 to impart longitudinal sliding movement to shaft 26 moving switch 74 to its closed position; moving switch 76 to its open position; and, positioning cam 70 in registry with the other leg portion of track 18.

As the shaft 26 moves from right to left when viewing Figure 9, the shaft 26 will engage the cam 70 to move rod 66 leftward, thereby opening switch 74, closing switch 76 and moving cam 72 into registry with one leg portion of the guide track.

The table top 12 supports bearings 78 on its undersurface that rotatably support relatively perpendicular feed screws 80 and 82. Clamp plates 84 and 86 are slidably received on the upper surface of the table top and include depending threaded sleeves 88 and 90 that extend downwardly through slots in the table top to receivably engage the screws 80 and 82. The plates 84 and 86 are employed for holding work on the table top and the plates 84 and 86 are independently adjusted to position work under the cutters 62.

The upper inner faces of the side members 14 and 16 are provided with forward and rear openings covered by plates 92 and 94 having central openings that slidably receive retractable holding lugs 96 and 98. Forward and rear horizontal shafts 100 and 102 are rotatably supported on the forward and rear legs 104 and 106 of the frame 10. A foot pedal 108 secured to shaft 100 is held raised by a coil spring 110 attached to the shaft 100 and one of the supporting legs of the frame 10.

Pitmans 112 connect the shafts 100 and 102 and permit rotation of the shafts 100 and 102 as a unit. Cords 114 and 116 are attached at their lower ends to the shafts 100 and 102, extend upwardly through the hollow side members 14 and 16, and are attached at their upper ends to the lugs 96 and 98 to retract the lugs against action of springs 120 which urge the lugs through the openings in plates 92, 94 when the foot pedal 108 is depressed.

Means is provided whereby the downward movement of the cutter support 28 may be controlled. This means comprises brake elements 122 including first and second arcuate channels 126 and 128 that are pivotally connected at one of their ends as at 130. The channels 126 are provided with outstanding flanges 125 which are removably secured by fasteners 132 to the flanges 127 integral with the sleeves 36 on the undersurface of the table top 12. The other ends of the channels 126 and 128 are slidably connected by bolts 134 about which coil springs 136 are disposed to bias the channels 126 and 128 apart as shown in Figure 4.

The elements 122 depend from the table top 12 and one element embraces one rod 34, there being one braking element 122 for each rod 34.

The channels 126, 128 carry brake linings 138 that will bear against the periphery of the rods as the channels are clamped against the rods 34.

Operating cords 140 and 142 are engaged over pulleys 144 suitably located on the side members and are attached to the channels 128. The cords extend through apertures 146 in the channels 126 (see Figure 4). A swingably mounted foot pedal 148 disposed under the table top and supported on a floor mounted bracket 150 is attached to the lower ends of cords 140 and 142. As the foot pedal 148 is depressed, the channels 128 will be pulled toward the channels 126 to grip the rods 34 to brake downward sliding movement of rods 34.

The side members 14 and 16 are provided with recesses 152 that slidably receive horizontally movable dogs 154 whose reduced portions 156 are urged by springs 158 supported in the recesses 152 through apertures 160 in cover plates 162 mounted at the entrances of the recesses.

Bell cranks 164 are pivotally attached at their apices in the recesses 152 for vertical swinging movement. The upper limbs of the bell cranks 164 engage lugs 166 projecting laterally from the dogs 154 and the lower channel shaped limbs 168 of the bell cranks extend outwardly through slots 170 in the plates 162 and pivotally support links 172 whose inner ends are urged against the limbs 168 by leaf springs 174 attached to the upwardly extending limbs of the bell cranks.

Headed pins 176 are fixed at their lower ends to the support 28 and extend upwardly from the support 28. Connectors 178 are slidably received on the pins 176 and engage the bifurcated ends 180 of parallel bars 182 that extend between the connectors. Collars 184 slidably adjustably received on the bars 182 are held longitudinally adjusted on the bars by set screws 186 carried by the collars 184. Fingers or pressure elements 188 extend downwardly from the collars 184 and slidably enter apertures 190 in the support 28.

Springs 192 embrace the pins 176 and are biased between the connectors 178 and the upper surface of support 28 to urge the connectors upwardly against the heads of the pins 176 and the lower ends of the fingers 188 substantially flush with the undersurface of the support 28.

As the cutter support 28 is moved downwardly the cutter support 28 will first ride against the cam surfaced end portion 156 to permit the support to clear the dogs 154. Then, the connectors 178 will ride downwardly against the cam surfaced end portions 156 to position the end portions 156 over the connectors 178 as shown in Figure 7. The support 28 will also ride downwardly upon links 172 to be disposed thereunder as shown in Figure 7.

During upward movement of the support 28 the same will engage the links 172 to impart vertical swinging movement to the bell cranks 164. Since the upper limbs of the bell cranks are engaged with the pins 166, the dogs 154 will be retracted, as shown in Figure 8, to permit the connectors 178 and the support 28 to clear the dogs. The connectors 178 will remain engaged with the dogs until the support 28 is raised sufficiently to move the cutters from the work thereby causing the presser fingers to hold the work against the table top until the cutters are raised.

The support 28 during its raising movement will clear the dogs 154 before the springs 158 can urge the dogs outwardly as the support 28 cams past the links 172.

A suitable switch means 200 shown in Figure 9 is operatively connected to one of the lugs 96, 98 to be actuated to a circuit closing position as the foot pedal 108 is depressed to retract the lugs 96, 98 whereupon the circuit to the reversible motor 40 is completed to drive the shafts 44 and 26 in the manner previously described. As the gears 22, 24 travel their tracks 22', 24', the shaft 26 will engage the cam 70 to shift rod 66 causing the switch 76 to be closed and switch 74 opened, whereupon the motor will be reversed to cause the gears 22, 24 to return to their starting position. This operation will be continuous unless a master switch 202 on the frame 10 and connected to the motor circuit is moved to its circuit closing position.

Having described the invention, what is claimed as new is:

1. A cutter machine comprising a frame including a table top and a pair of side members extending upwardly from the table top, a vertically movable horizontally disposed support carried by the side members and movable toward and away from the table top, cutters depending from the support adapted to cut material on the top as the support is moved toward the top, a plurality of vertically slidable fingers carried by the support and movable well below the undersurface of the support, spring means retaining said fingers raised relative to the support, means on the side members for retaining the fingers lowered against action of the spring means during raising of the support after the support has been lowered toward the top, whereby the fingers will retain material cut by the cutters against the top during raising of the support, and means pivotally mounted on the side members and engaged with said finger retaining means for releasing the latter, said pivotally mounted means including parts engageable with the support as the support is raised from its lowered position to actuate the pivotally mounted means and release the retaining means.

2. A cutter machine comprising a frame including a table top and a pair of side members extending upwardly from the table top, a vertically movable horizontally disposed support carried by the side members and movable toward and away from the table top, cutters depending from the support adapted to cut material on the top as the support is moved toward the top, a plurality of spaced parallel horizontal bars slidably mounted for vertical movement over the support, a group of vertical fingers carried by each bar, said support having a group of apertures accommodating the fingers, a pair of connectors joining the bars whereby the same may move as a unit, means engaging the connectors and urging the same upwardly from the support, means carried by the side members engaging the connectors during lowering of the support to retain the fingers downwardly relative to the support as the latter is raised from its lowered position, and means actuated by the support during raising of the support for releasing said retaining means.

3. A cutter machine comprising a frame including a table top and a pair of side members extending upwardly from the table top, a vertically movable horizontally disposed support carried by the side members and movable toward and away from the table top, cutters depending from the support adapted to cut material on the top as the support is moved toward the top, a plurality of spaced parallel horizontal bars slidably mounted for vertical movement over the support, a group of vertical fingers carried by each bar, said support having a group of apertures accommodating the fingers, a pair of connectors joining the bars whereby the same may move as a unit, means engaging the connectors and urging the same upwardly from the support, means carried by the side members engaging the connectors during lowering of the support to retain the fingers downwardly relative to the support as the latter is raised from its lowered position, vertically swingable bell cranks pivoted at their apices to the side members and having upper limbs engaged with said retaining means, and spring urged links pivoted to the lower limbs of said bell cranks disposed in the path of the support whereby the support may move past the bell cranks as the support is lowered, said support engaging the links and swinging the bell cranks to a position for releasing the retaining means as the support is raised from its lowered position.

4. A cutter machine comprising a frame including a table top and a pair of side members extending upwardly from the table top, a vertically movable horizontally disposed support carried by the side members and movable toward and away from the table top, cutters depending from the support adapted to cut material on the top as the support is moved toward the top, a plurality of spaced parallel horizontal bars slidably mounted for vertical movement over the support, a group of vertical fingers carried by each bar, said support having a group of apertures accommodating the fingers, a pair of connectors joining the bars whereby the same may move as a unit, means engaging the connectors and urging the same upwardly from the support, means carried by the side members engaging the connectors during lowering of the support to retain the fingers downwardly relative to the support as the latter is raised from its lowered position, and means actuated by the support during raising of the support for releasing said retaining means, said retaining means including a plurality of horizontally slidable spring urged dogs having downwardly sloping cam surfaces against which the connectors will ride to engage under the dogs as the support is lowered.

5. A cutter machine comprising a frame including a table top and a pair of side members extending upwardly from the table top, a vertically movable horizontally disposed support carried by the side members and movable toward and away from the table top, cutters depending from the support adapted to cut material on the top as the support is moved toward the top, a plurality of spaced parallel horizontal bars slidably mounted for vertical movement over the support, a group of vertical fingers carried by each bar, said support having a group of apertures accommodating the fingers, a pair of connectors joining the bars whereby the same may move as a unit, means engaging the connectors and urging the same upwardly from the support, means carried by the side members engaging the connectors during lowering of the support to retain the fingers downwardly relative to the support as the latter is raised from its lowered position, said retaining means for the fingers including a plurality of horizontally slidable spring urged dogs carried by the side members, vertically swingable bell cranks pivoted at their apices to the side members and having upper limbs engaged with the dogs, vertically swingable links pivoted to the lower limbs of the bell cranks, springs engaging and holding the links against the lower limbs of the bell crank, said links being disposed in the path of the support to swing downwardly independently of the bell cranks as the support is lowered and said links being engaged with the support to swing the bell cranks and release the dogs from engagement with the connectors as the support is raised from its lowered position.

6. In a material cutting machine including a vertically reciprocating cutter support and a table top toward which the support is moved downwardly to cut material on the top; means for retaining material cut by the support against the table top as the support is raised to bring its cutters clear of the material; said means comprising vertically slidable elements carried by the support and movable below the underside of the support, means connecting the elements whereby the same will move as a unit, means engaging and urging the elements raised relative to the support, means on the machine and engageable with the connecting means to retain the elements lowered during the raising of the support relative to the top, and means actuated by the support during the raising of the support from its lowered position for releasing said element retaining means.

7. In a material cutting machine including a vertically reciprocating cutter support and a table top toward which the support is moved downwardly to cut material on the top; means for retaining material cut by the support against the table top as the support is raised to bring its cutters clear of the material, said means comprising vertically slidable elements carried by the support and movable below the underside of the support, means connecting the elements whereby the same will move as a unit, means engaging and urging the elements raised relative to the support, horizontally slidable spring urged dogs carried by the machine above the top and having cam surfaces against which the connecting means rides to move the dogs and position the connecting means under the dogs as the support is lowered and means swingably mounted on the machine under the dogs and above the top and actuated by the support as the latter is raised to release the dogs.

References Cited in the file of this patent
UNITED STATES PATENTS

| Number | Name | Date |
|---|---|---|
| 558,864 | Van Osta | Apr. 21, 1896 |
| 1,615,623 | Griffiths et al. | Jan. 25, 1927 |
| 1,775,359 | Thomas | Sept. 9, 1930 |
| 2,229,488 | Barbieri | Jan. 21, 1941 |
| 2,325,990 | Wales | Aug. 3, 1943 |
| 2,361,687 | Hermani | Oct. 31, 1944 |
| 2,417,813 | Curtis | Mar. 25, 1947 |